May 1, 1962 L. MAGAZANIK 3,032,183
ROAD REFLECTOR SIGNAL DEVICES
Filed May 31, 1960 2 Sheets-Sheet 1
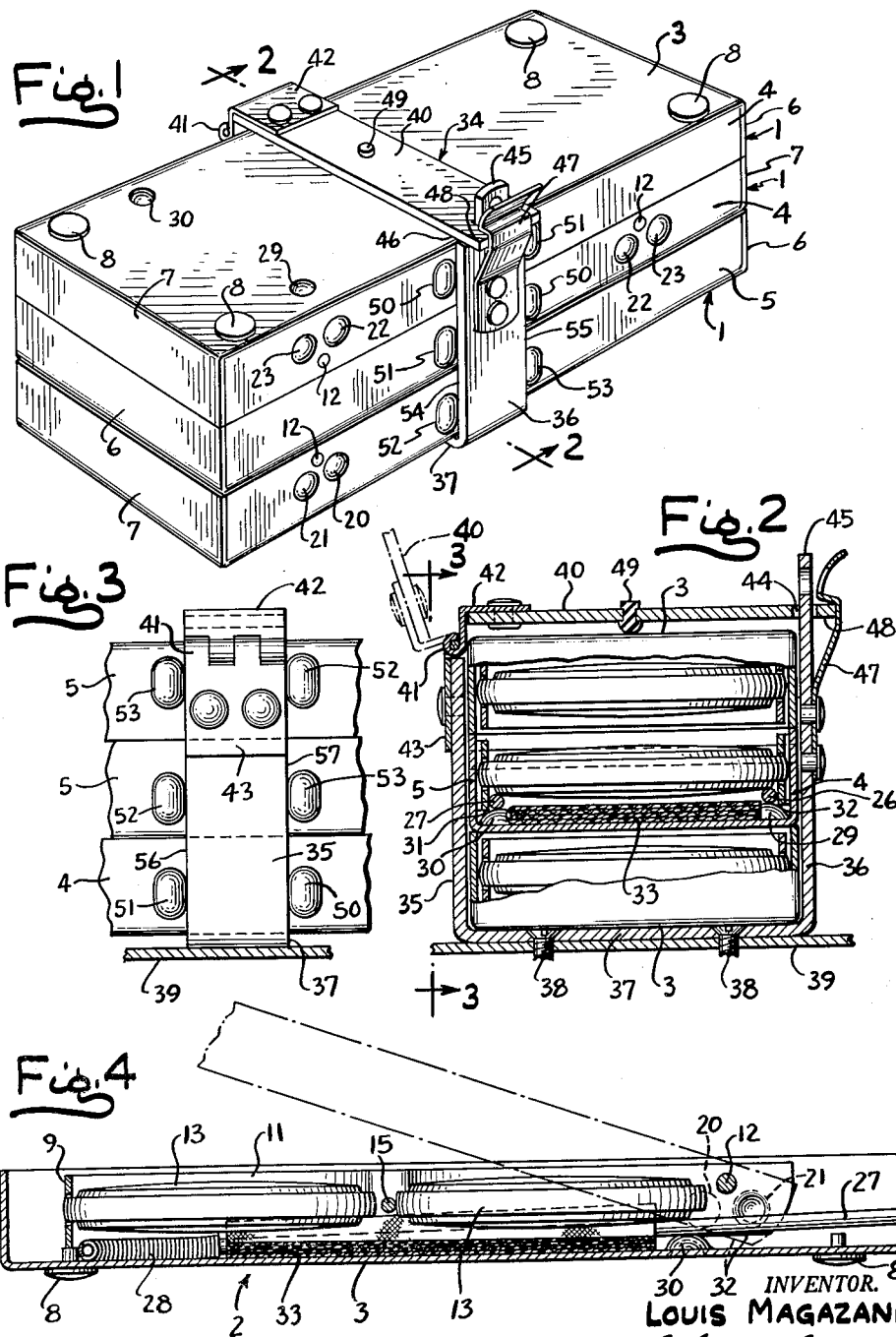
INVENTOR.
LOUIS MAGAZANIK
BY
ATTY.

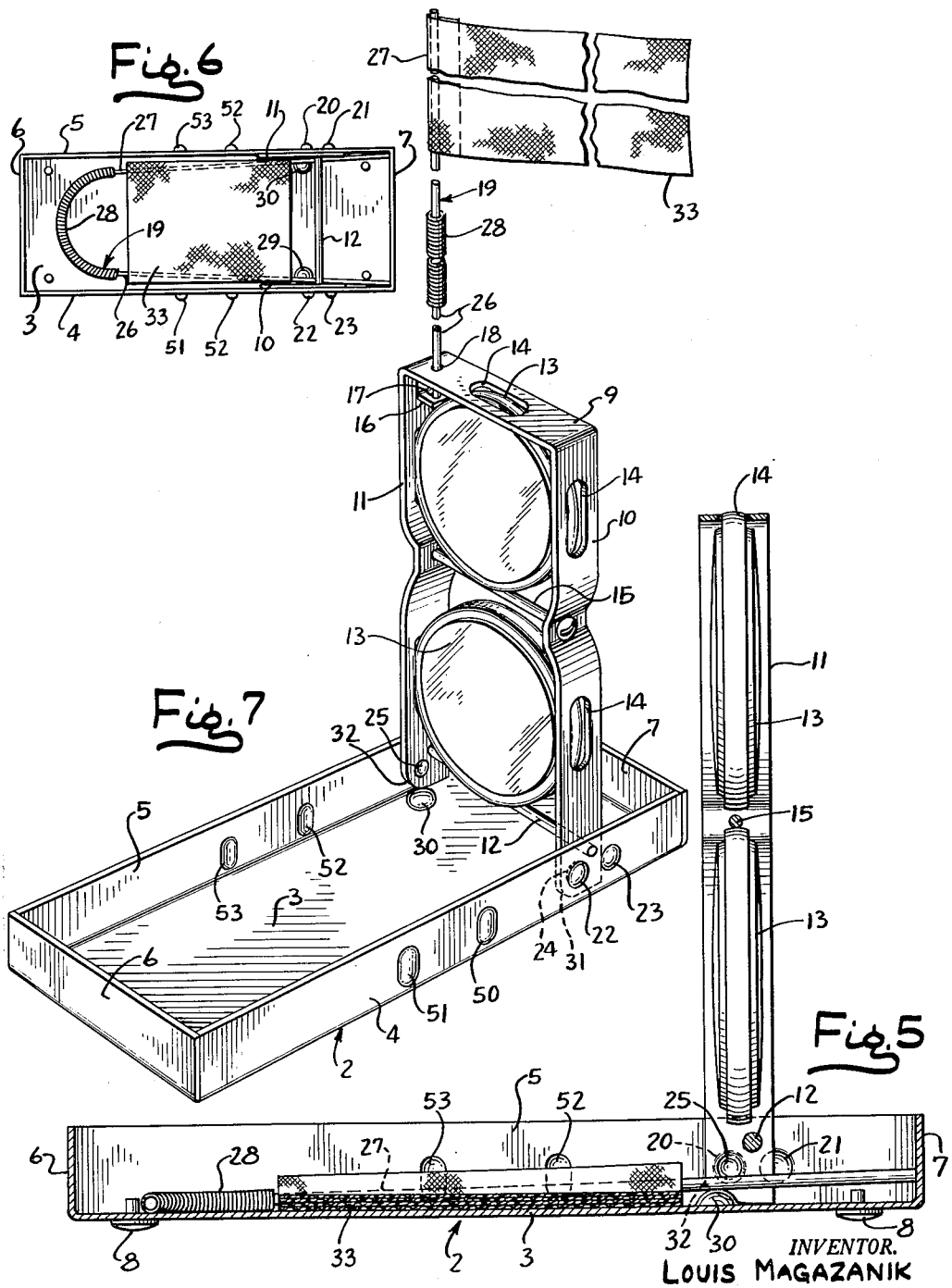

United States Patent Office 3,032,183
Patented May 1, 1962

3,032,183
ROAD REFLECTOR SIGNAL DEVICES
Louis Magazanik, Chicago, Ill., assignor to Doray Lamp Co., Inc., Chicago, Ill., a corporation of Illinois
Filed May 31, 1960, Ser. No. 32,970
11 Claims. (Cl. 206—65)

This invention relates to improvements in reflector signal devices of the type used by vehicle operators for warning approaching vehicles and in the manner in which a plurality of such devices are assembled for storage within a vehicle.

It is an object of the present invention to provide a road reflector signal device package in which two or more of the devices are juxtaposed and clamped together to form a compact assembly capable of being stored within the emergency tool compartment of a vehicle.

It is also an object of the present invention to provide a package of the type stated in which a single clamping member embraces the assembled devices approximately midway between two opposite ends of the package. The clamping member is preferably a bracket of the type that can be quickly locked and unlocked when it is desired to disassemble or reassemble the devices.

It is a further and more specific object of the present invention to provide a package of the type stated in which each device has a base plate, opposed side plates and opposed end plates, the several plates forming the sides of the package to enclose completely the reflecting lenses and other mechanism within each device and thus prevent damage or breakage thereof during storage within the vehicles. To insure proper positioning of the end plates when the devices are assembled, the side plates of the devices are formed with outwardly struck projections which cooperate with the clamping member so that each time the devices are reassembled the end plates will be in alignment and form the end walls of the assembly.

It is another object of the present invention to provide a road reflector signal device having a reflector-frame having arms pivotally mounted on the side plates of the base of the unit so that the frame may be swung open or closed; and a signal flag staff removably stored within the base. The flag staff is preferably one having opposite end rods joined by a central portion which is in the form of a spring so that the flag staff may be bent to U-shape at the central spring portion and placed within the frame for storage with the end rods biased by the central spring portion against the frame arms in the region of their pivotal connections with the side plates of the base. To prevent interference of the end rods with the reflector-frame ends as the reflector-frame is swung open, the base plate of the frame is formed with upstruck beads for supporting the rods well above the level of the base plate.

The attainment of the above and further objects of the present invention will be apparent from the following specification taken in conjunction with the accompanying drawing forming a part thereof.

In the drawing:

FIG. 1 is a perspective view of a plurality of signal devices assembled together in accordance with the present invention;

FIG. 2 is a sectional view, partially broken away, and taken along line 2—2 of FIG. 1;

FIG. 3 is a fragmentary sectional view taken along line 3—3 of FIG. 2;

FIG. 4 is a longitudinal sectional view of one of the signal devices forming part of the present invention and showing the reflector frame thereof in its collapsed position;

FIG. 5 is a longitudinal sectional view similar to FIG. 4 and showing the reflector frame in its upright or extended position;

FIG. 6 is a top plan view on a reduced scale of one of the signal devices with a part of the reflector frame being broken away; and FIG. 7 is a perspective view of one of the signal devices with the reflector frame in its upright extended position and with the signal flag staff in position therein.

Like reference numerals designate like parts throughout the drawings.

Referring now in more detail to the drawing which illustrates a preferred embodiment of the present invention, 1 designates each of a plurality of road reflector signal devices. Each device 1 comprises a base 2 which includes a rectangular base plate 3, spaced parallel substantially rectangular side plates 4, 5, and spaced parallel rectangular end plates 6, 7. The side and end plates 4, 5, 6, 7 are integral with the base plate 3 and extend upwardly from the longitudinal and transverse margins thereof. Mounted on the base plate 3 adjacent to the four corners thereof are rubber grommets or feet 8 by which the device 1 can be firmly supported on a roadway or the like.

Also forming part of the signal device 1 is a reflector frame 9 having spaced resilient arms 10, 11. The lower ends of these arms 10, 11 are pivotally mounted on a pivot shaft 12, which is mounted in and extends between side plates 4, 5, upwardly from the base plate 3. The frame 9 is adapted to carry one or more reflectors 13 which include conventional autocollimating lenses. Formed in the frame 9 is a plurality of slots 14 through which parts of the peripheries of the reflectors 13 project. A bolt 15 extends between the frame arms 10, 11 to draw them into firm grip-forming relationship with the reflectors 13. Struck inwardly from the leg 11 is a flange 16 having a hole 17 which is in alignment with another hole 18 on the frame 9. The two holes 17, 18 are adapted to removably receive a flag staff 19 which will presently be more fully described.

On each side of the pivot shaft 12 and somewhat downwardly therefrom the side plates 4, 5 are formed with outwardly struck elements 20, 21, 22, 23 which form recesses for receiving companion-shaped detents 24, 25, the latter being struck outwardly from the lower ends of the frame arms 10, 11. When the frame is in the retracted position as shown, for example, in full lines in FIG. 4, the arms 10, 11 lie within the side plates 4, 5 and the resiliency of the arms 10, 11 causes the detents 24, 25 to be pressed into the recesses formed by the elements 20, 21, 22, 23 and thus firmly hold the frame 9 against swinging movement about the pivot shaft 12.

Removably stored within the base 2 is a flag staff 19 which is preferably formed of two rods 26, 27 joined by a central coil spring portion 28. When stored within the base 2 the flag staff 19 may, by reason of the spring portion 28, be bent into a U-shape so that the rods 26, 27 lie substantially along the frame arms 10, 11 with the rods 26, 27 being biased by the spring portion 28 against the arms 10, 11 in the region of the pivot shaft 12. Struck upwardly from the base plate 3 and approximately below the elements 20, 22 are beads 29, 30 which form supports upon which the rods 26, 27 rest. The beads 29, 30 hold those portions of the rods 26, 27 which are in the region of the pivot shaft 12 upwardly from the base plate 3. The height of the beads 29, 30 above the base 3 is sufficient so that when the frame 9 is in the retracted position the edges 31, 32 of the arms 10, 11 will lie below the portions of the rods 26, 27 which are adjacent thereto. A cloth flag 33 may be folded several times and placed between the flag staff 19 and reflectors 13.

When it is desired to move the frame 9 to its extended position as shown in FIGS. 5 and 7 the frame 9 is lifted initially to the position shown in dotted lines in FIG. 4, whereupon the detents 24, 25 will ride out of the recesses formed by the elements 21, 23. During this movement the portion of the edges 31, 32 to the right (FIG. 4) of the pivot shaft 12 will shift downwardly toward the base plate 3 and will pass between the rods 26, 27 and side plates 4, 5. In the absence of the beads 29, 30 the rods 26, 27 might underlie the arms 10, 11 and the edges 31, 32 would in that case bind against the rods 26, 27 and obstruct the movement of the frame 9. The beads 29, 30 however, elevate the portions of the rods 26, 27 adjacent to the edges 31, 32 to permit free movement of the frame 9.

Upon further movement of the frame 9 from the dotted line position shown in FIG. 4 to the position shown in FIGS. 5 and 7, the detents 24, 25 will ride along the inside faces of the side plates 4, 5 until the frame 9 approaches its fully extended position. At that time the detents 24, 25 will, as a result of the spring action of the arms 10, 11, snap into the recesses formed by the elements 20, 22 and lock the frame 9 in its extended position. The signal device 1 can then be placed upon the roadway to give a visual warning to approaching motorists that a dangerous condition exists on the road ahead. During the hours of daylight the flag staff 19 and cloth flag 33 may be removed from the base 2, the flag 33 placed upon one of the rods 26, 27 and the other rod inserted within the holes 17, 18. When the devices are no longer needed on the rod the flag staff 19 and flag 33 may easily be placed within the base 2, whereupon the frame 9 may be shifted to its retracted position, as shown in full lines in FIG. 4.

As shown in FIGS. 1–3 several signal devices 1 may be assembled together in a compact manner. For this purpose a clamping member is provided for cooperation with a plurality of the signal devices 1. The clamping member is preferably in the form of an articulated bracket 34 of heavy gauge sheet metal having spaced parallel legs 35, 36 which are joined by a bight 37. The legs 35, 36 are spaced apart a distance slightly greater than the distance between the outsides of the side walls 5, 6. The bight 37 is preferably drilled and countersunk for receiving screws 38 by which the bracket 34 may be secured to a wall 39 of the emergency tool compartment of the vehicle or to any other suitable surface on the vehicle. The bracket 34 also includes a sheet metal locking bar 40 which is secured to the free end of the leg 35 by a hinge 41, the latter having hinged plates 42, 43 riveted to the locking bar 40 and leg 35, respectively. The other end of the locking bar 40 is formed with a transverse slot 44 for receiving a tongue 45 on the free end of the leg 36 so that the locking bar 40 rests upon a shoulder 46 on the leg 36. A spring clip 47 is riveted to the outside face of the leg 36 and serves as a latch for engaging the free end 48 of the locking bar 40 to hold the latter firmly against the shoulder 46. The locking bar 40 is preferably spaced a short distance from the base plate 3 of one of the devices and a rubber grommet 49 is mounted upon the locking bar 40 approximately midway between the ends thereof to insure a firm grip by the bracket 34 on the assembled devices.

Formed in the side plates 4, 5 of each of the units 1 are outwardly struck projections 50, 51, 52, 53 which lie on each side of the bracket legs 35, 36 and are spaced apart on each side plate a distance slightly less than the width of the bracket legs, so that the edges 54, 55, 56, 57 of the legs 35, 36 bear against the surfaces of the projections very near the side plates 4, 5.

In assembling the several reflector devices 1 the locking bar 40 is open, that is, in the broken line position shown in FIG. 2. One of the devices is then placed between the legs 35, 36 with the projections 50, 51, 52, 53 thereon on each side of the bracket legs 35, 36. This first device is also preferably placed within the bracket 34 so that its base plate 3 bears against the bight 37. The remaining devices are similarly placed within the bracket with the last inserted device having its base plate 3 presented towards the locking bar 40. The locking bar 40 is thereafter swung to the position shown in full lines in FIG. 2 so that the end 48 pushes the spring clip 47 to the right (FIG. 3) until the spring 47 snaps over said end 48 and locks it in the position shown. When it is desired to use any of the signal devices the spring clip 47 is pulled back, the locking bar 40 swung open, and one or more of the signal devices removed and used in the manner previously described.

The base plate 3, side plates 4, 5 and end plates 6, 7 form a substantially rectangular assembly and these plates 3, 4, 5, 6, 7 form the walls of the assembly and serve to protect the lenses of the reflectors 13 from damage or breakage during storage of the devices within the vehicle. The side plate projections 50, 51, 52, 53 serve as guides during assembly of the devices to insure proper endwise alignment of the end plates 6, 7 and also prevent any endwise shifting of the devices once they have been assembled. Moreover, the bracket 34 constitutes a single clamping member, thus dispensing with the need for securing devices at each end of the assembly.

In compliance with the requirements of the patent statutes, I have herein shown and described a preferred embodiment of the invention. It is, however, to be understood that the invention is not limited to the precise construction herein shown, the same being merely illustrative of the principles of the invention. What is considered new and desired to be secured by Letters Patent is:

1. An assembly of at least two road reflector signal devices, each having opposite side members, said devices being juxtaposed with said side members forming two opposite sides of the assembly, means for releasably holding the devices in assembled relationship, said means being disposed along the two opposite sides of the assembly and having a part thereof extending between said two opposite sides exteriorly of the assembly, said means lying between the ends of the assembly that are laterally spaced from said means, and protruberances on said two opposite sides cooperating with the holding means for locating the relative positions of the devices when the latter are assembled with the holding means to insure assembly of the devices in predetermined aligned relationship.

2. An assembly of at least two road reflector signal devices each having opposite side members, said devices being juxtaposed with said side members forming two opposite sides of the assembly, an articulated bracket embracing the assembly and extending along said sides and having one part removably locking with another part for permitting disassembly and reassembly of the devices, and protuberances on said two opposite sides cooperating with the bracket for locating the relative positions of the devices in predetermined aligned relationship.

3. A road reflector signal device package comprising a plurality of individual road reflector signal devices each having opposite side members and being assembled in side-by-side relationship with said opposite side members forming two opposite sides of the assembly, clamping means embracing the assembled devices and lying between two opposite ends of the devices for releasably holding the devices in assembled relationship, said clamping means having two legs, one on each of two opposite sides of the assembly, the two opposite sides of the assembly having outward projections at each side of the legs for aligning said opposite ends of the devices when they are assembled with the clamping means, and means hingedly connected to one of said legs, said last-mentioned means also releasably interlocking with the other leg to permit assembly and disassembly of the devices.

4. A road reflector signal device package according to claim 3 wherein the hingedly connected means has a resilient element which is in pressure engagement with one of the devices when said hingedly connected means is in interlocked position with said other leg.

5. In combination, at least two similar road reflector signal devices each of which includes a base plate, a pair of opposite side members, and a pair of opposite end members, the devices being in side-by-side assembled relationship with the base plates on the outside of the assembly and the side members and end members forming two pairs of opposite sides of the assembly, clamping means for holding the devices in assembled relationship, said clamping means extending along one pair of opposite sides of the assembly and said base plates, said clamping means having parts releasably interlocking to permit disassembly of said devices, and outwardly extending projections on said assembly cooperating with the clamping means for aligning said other pair of opposite ends of each of the devices when the devices are assembled with the clamping means.

6. In combination, at least two similar road reflector signal devices each of which includes a base plate, a pair of opposite side members, and a pair of opposite end members, the devices being in side-by-side assembled relationship with the base plates on the outside of the assembly and the side members and end members forming two pairs of opposite sides of the assembly, clamping means for holding the devices in assembled relationship, said means including a bracket having two legs extending along one pair of opposite sides of the assembly, one leg being on each side, said bracket also having a bar overlying one of the base plates and being pivotally mounted on one of said legs, said bracket also releasably locking with the other leg for permitting disassembly of the devices, and means on said one pair of opposite sides of the assembly and lying adjacent to the bracket legs for aligning the members forming said other pair of opposite sides of the assembly when the devices are assembled with the clamping means.

7. A combination according to claim 6 wherein the means on the one pair of opposite sides of said assembly comprises a plurality of outwardly struck projections at each edge of the bracket legs.

8. A foldable signal comprising a supporting base having a base plate and a pair of upstanding sides, a frame having a pair of arms pivotally mounted on the sides and being movable from a retracted position overlying said base plate to an upright extended position, said arms each having an edge presented toward the base plate and the portion of the edges in the regions of the pivotal connections being adjacent to the sides and spaced from said base plate, and means on said base plate for supporting a member in the region of the pivoted connections to hold the parts of the member in said region spaced from the base plate an amount sufficient such that portions of said edges are between the base plate and said supported parts of the member, whereby the frame may be shifted from retracted to extended position without interference from the member.

9. A foldable signal comprising a supporting base having a base plate and a pair of upstanding sides, a frame having a pair of arms pivotally mounted on the sides and being movable from a retracted position overlying said base plate to an upright extended position, said arms each having an edge presented toward the base plate and the portion of the edges in the regions of the pivotal connections being adjacent to the sides and spaced from said base plate, a flag staff removably stored in said base and lying adjacent to said arms at said pivotal connections, said flag staff comprising a pair of rods joined by a spring and the two rods being urged against the arms in said regions of pivotal connections by said spring, and projections struck from said base plate for supporting said flag staff in the region of the pivoted connections to hold the parts of the flag staff in said region spaced from the base plate an amount sufficient such that said portions of said edges are between the base plate and said supported parts of the flag staff presented in a direction opposite to the base plate whereby the frame may be shifted from retracted to extended position without interference from the flag staff.

10. A foldable signal comprising a supporting base having a base plate and a pair of upstanding sides, a frame having a pair of arms pivotally mounted on the sides and being movable from a retracted position overlying said base plate to an upright extended position, the parts of the arms adjacent to the pivotal connections being within the base when the frame is in either position, and means projecting from said base and toward said arms for supporting a member stored within the base and having a part thereof adjacent to at least one of said arms at the pivotal connection thereof, said means serving to prevent interference of the member with the frame upon movement of the frame from retracted to extended position.

11. A foldable signal comprising a supporting base having a base plate and a pair of upstanding sides, a frame having a pair of arms pivotally mounted on the sides and being movable from a retracted position overlying said base plate to an upright extended position, the parts of the arms adjacent to pivotal connections being within the base when the frame is in either position, and said base plate having means raised from said base plate adjacent to said pivotal connections for supporting a structure within the base upwardly from the base plate in the region of said pivotal connections.

References Cited in the file of this patent

UNITED STATES PATENTS

| | | |
|---|---|---|
| 2,329,422 | Skerfving | Sept. 14, 1943 |
| 2,525,728 | Sauer | Oct. 10, 1950 |
| 2,679,370 | Bolser | May 25, 1954 |